United States Patent
Yoon et al.

(10) Patent No.: US 10,674,517 B2
(45) Date of Patent: Jun. 2, 2020

(54) METHOD AND APPARATUS FOR USING RESOURCE INFORMATION IN WIRELESS COMMUNICATION SYSTEM

(71) Applicant: Samsung Electronics Co., Ltd., Suwon-si, Gyeonggi-do (KR)

(72) Inventors: Suha Yoon, Yongin-si (KR); Euichang Jung, Seoul (KR); Suyoung Park, Uiwang-si (KR); Sunghyuk Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/980,137

(22) Filed: May 15, 2018

(65) Prior Publication Data

US 2018/0338312 A1    Nov. 22, 2018

(30) Foreign Application Priority Data

May 16, 2017    (KR) .......................... 10-2017-0060516

(51) Int. Cl.
| | |
|---|---|
| *H04W 4/00* | (2018.01) |
| *H04W 72/08* | (2009.01) |
| *H04W 72/04* | (2009.01) |
| *H04L 5/00* | (2006.01) |
| *H04W 88/08* | (2009.01) |
| *H04W 88/02* | (2009.01) |

(52) U.S. Cl.
CPC .............. *H04W 72/08* (2013.01); *H04L 5/00* (2013.01); *H04W 72/0453* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2007/0237248 A1* | 10/2007 | Jung ....................... | H04L 5/023 375/260 |
| 2010/0260137 A1 | 10/2010 | Vrzic et al. | |
| 2014/0112290 A1* | 4/2014 | Chun ........................ | H04L 5/00 370/329 |
| 2014/0334478 A1* | 11/2014 | Cheng ................... | H04L 27/261 370/350 |
| 2015/0049642 A1 | 2/2015 | Eng et al. | |

(Continued)

*Primary Examiner* — Phirin Sam
(74) *Attorney, Agent, or Firm* — Jefferson IP Law, LLP

(57) ABSTRACT

The disclosure relates to a 5G or pre-5G communication system for supporting a higher data transfer rate after a 4G communication system, such as LTE. A method for a terminal is provided. The method includes receiving bandwidth information from a base station, generating resource block (RB) index mapping information based on the bandwidth information and subcarrier interval information, receiving RB indexing information indicating resource information from the base station, and identifying the location of the resource information based on the RB indexing information, the subcarrier interval of the resource information, and the RB index mapping information, and a terminal performing the method. Furthermore, the disclosure may provide a method for a base station to operate with the terminal and a base station operating with the terminal.

12 Claims, 8 Drawing Sheets

(56) References Cited

U.S. PATENT DOCUMENTS

| | | | |
|---|---|---|---|
| 2015/0327180 A1* | 11/2015 | Ryu | H04L 1/00 |
| | | | 370/329 |
| 2016/0227560 A1* | 8/2016 | Webb | H04W 72/1242 |
| 2016/0337019 A1* | 11/2016 | Chung | H04B 7/0473 |
| 2016/0345321 A1 | 11/2016 | Chen et al. | |
| 2017/0164400 A1* | 6/2017 | Fong | H04W 74/002 |
| 2017/0347353 A1* | 11/2017 | Yerramalli | H04W 72/0413 |
| 2018/0131493 A1* | 5/2018 | Luo | H04L 5/0048 |
| 2018/0132269 A1* | 5/2018 | Wang | H04W 52/365 |
| 2018/0160405 A1* | 6/2018 | Akkarakaran | H04W 72/042 |
| 2018/0198555 A1* | 7/2018 | Wu | H04L 1/0009 |
| 2018/0367285 A1* | 12/2018 | Yi | H04L 5/0055 |
| 2019/0053197 A1* | 2/2019 | Kim | H04W 6/14 |
| 2019/0141688 A1* | 5/2019 | Lee | H04W 72/042 |
| 2019/0289592 A1* | 9/2019 | Lee | H04L 1/1854 |
| 2019/0394003 A1* | 12/2019 | Kim | H04L 5/0044 |

* cited by examiner

METHOD AND APPARATUS FOR USING RESOURCE INFORMATION IN WIRELESS COMMUNICATION SYSTEM

CROSS-REFERENCE TO RELATED APPLICATION(S)

This application is based on and claims priority under 35 U.S.C. § 119 of a Korean patent application number 10-2017-0060516, filed on May 16, 2017, in the Korean Intellectual Property Office, the disclosure of which is incorporated by reference herein in its entirety.

BACKGROUND

1. Field

The disclosure relates to a method and apparatus for using resource information in a wireless communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have recently been researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for providing a method and apparatus for using resource information in a wireless communication system.

Another aspect of the disclosure is to provide a method and apparatus for indexing a resource block (RB) and to provide a communication method and apparatus based on RB indexing.

Additional aspects will be set forth in part in the description which follows and, in part, will be apparent from the description, or may be learned by practice of the presented embodiments.

In accordance with an aspect of the disclosure, a method for a user equipment (UE) to operate is provided. The method includes receiving bandwidth information from a base station, generating RB index mapping information based on the bandwidth information and subcarrier interval information, receiving RB indexing information indicating resource information from the base station, and identifying the location of the resource information based on the RB indexing information, the subcarrier interval of the resource information, and the RB index mapping information.

In accordance with an aspect of the disclosure, a terminal is provided. The terminal includes a transceiver configured to transmit and receive signals and at least one processor configured to receive bandwidth information from a base station, to generate RB index mapping information based on the bandwidth information and subcarrier interval information, to receive RB indexing information indicating resource information from the base station, and to identify the location of the resource information based on the RB indexing information, the subcarrier interval of the resource information, and the RB index mapping information.

In accordance with an aspect of the disclosure, a method for a base station to operate is provided. The method includes generating RB index mapping information based on bandwidth information and subcarrier interval information, transmitting the bandwidth information to a terminal, and transmitting an RB index indicating a part of resource information of the bandwidth to the terminal based on the RB index mapping information, wherein the RB index is determined based on the subcarrier interval of the resource information and the RB index mapping information.

In accordance with an aspect of the disclosure, a base station is provided. The base station includes a transceiver configured to transmit and receive signals and at least one processor configured to generate RB index mapping information based on bandwidth information and subcarrier interval information, to transmit the bandwidth information to a terminal, and to transmit an RB index indicating a part of resource information of the bandwidth to the terminal based on the RB index mapping information, wherein the RB index are determined based on the subcarrier interval of the resource information and the RB index mapping information.

Embodiments of the disclosure are not limited to the aforementioned embodiments, and other embodiments not described above may be evidently understood by a person having ordinary skill in the art to which the disclosure pertains from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
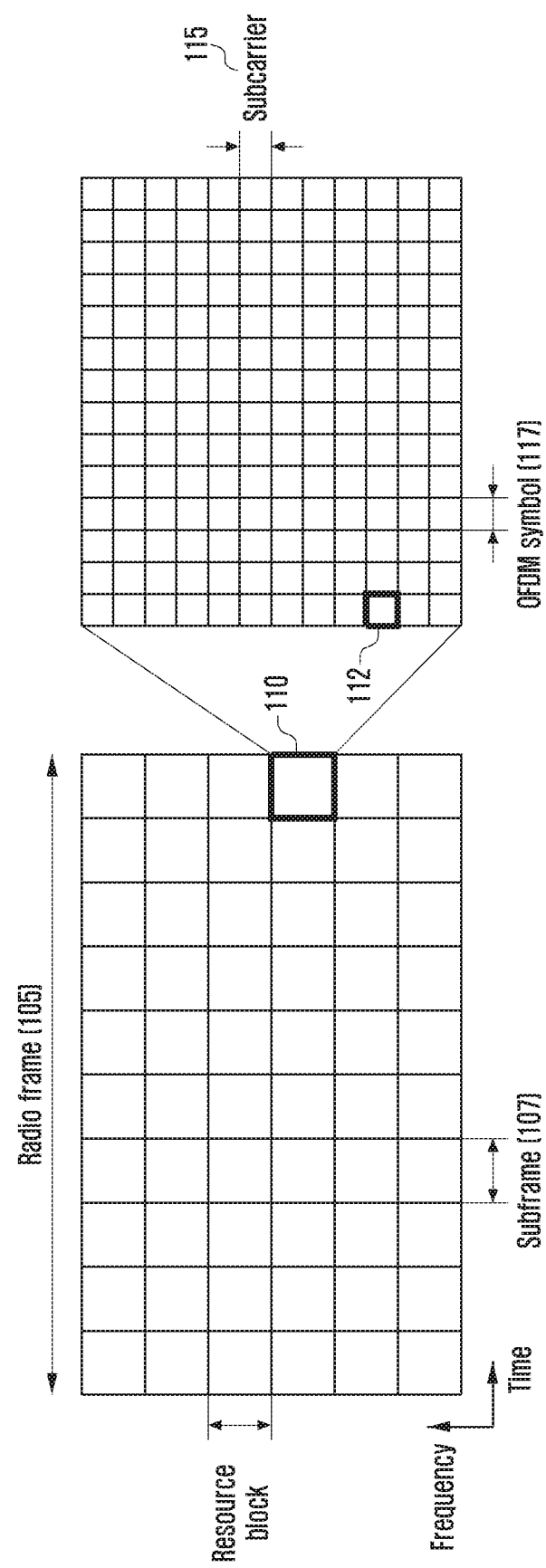
FIG. 1 is a diagram showing a radio resource according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, a description of contents that are well known in the art to which this specification pertains and are not directly related to this specification is omitted in order to transfer the gist of this specification more clearly without making the gist of this specification obscure by omitting an unnecessary description.

For the same reason, in the accompanying drawings, some elements have been illustrated as being enlarged, omitted or schematically depicted. Furthermore, the size of each element does not accurately reflect its real size. Accordingly, the disclosure is not restricted by a relative size or interval drawn in the accompanying drawings. In each drawing, the same or corresponding element has been assigned the same reference numeral.

The advantages and features of the disclosure and the manner of achieving them will become apparent with reference to the embodiments described in detail below with reference to the accompanying drawings. The disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The following embodiments of the disclosure relate to 5G (or new radio (NR)) communication. However, the embodiments of the disclosure are not limited to 5G communication, and may be applied to a system in which the indexing of an RB needs to be newly defined based on subcarrier spacing. The subcarrier spacing may be called a subcarrier interval. The subcarrier interval may be defined as the size or length of the frequency band of a subcarrier.

5G wireless communication has an object of providing various services, such as an enhanced mobile broadband (eMBB), ultra-reliable and low-latency communications (URLLC) and massive machine type communications (mMTC).

In an embodiment of the disclosure, a method for a user equipment (UE) to perform RB indexing is basically described as an example. In an embodiment of the disclosure, a UE may be defined as a terminal. A network or base station that performs scheduling may be aware of information on RB indexing in advance, and thus there is provided a method of performing the same RB indexing as that of a base station or a network is provided. A base station or a network may perform RB indexing using the same method as that applied to a UE. Accordingly, in an embodiment of the disclosure, a method for a UE to perform RB indexing may be identically applied to a base station and a network entity.

FIG. 1 is a diagram showing a radio resource according to an embodiment of the disclosure.

Referring to FIG. 1, long term evolution (LTE) and 5G are based on orthogonal frequency division multiplexing (OFDM) in the downlink. In an embodiment of the disclosure, a basic unit of resource allocation in a wireless communication system using the OFDMA scheme is defined as a resource block (RB) 110. One RB 110 may include 12 subcarriers in a frequency axis and 1 subframe in a time axis. For example, in LTE, a subframe 107 is 1 msec and includes 14 OFDM symbols. 10 subframes gather to form one radio frame 105. The 5G system may use the same subframe structure as LTE or may use a subframe structure different from that of LTE. For example, the length of a subframe and the length of a subcarrier interval may be differently configured in the 5G system compared to the LTE system.

Furthermore, a basic unit of a radio resource is called a resource element (RE). One RE 112 includes one subcarrier 115 in the frequency axis, one OFDM symbol 117 in the time axis, and one virtual antenna port in the space axis. That is, one modulation signal is transmitted using one RE. If a resource is allocated in an RE unit, a basic unit of resource allocation may be defined as an RB because the amount of information for indicating resource allocation is greatly increased.

In the LTE system, subcarrier spacing is fixed to 15 kHz. In contrast, in a 5G system according to an embodiment of the disclosure, a plurality of numerologies (e.g., subcarrier spacing: 7.5 kHz, 15 kHz, 30 kHz, 60 kHz, 120 kHz, etc.) may be supported in order to provide various services (e.g., eMBB, URLLC and mMTC) and to provide wireless communication in various frequency ranges (e.g., sub-6 GHz and above-6 GHz). Furthermore, in the 5G system, a plurality of numerologies may be subjected to time division multiplexing (TDM) or frequency division multiplexing (FDM) within one carrier. That is, in the 5G system according to an embodiment of the disclosure, resources having different subcarrier intervals may be configured within one carrier. In the case of TDM, resources having different subcarrier intervals may be configured based on a subframe or symbol. In the case of FDM, resources having different subcarrier intervals may be configured based on a frequency band.

In the LTE system, in general, a subcarrier interval is 15 kHz as described above, and a subcarrier interval of 15 kHz or 7.5 kHz may be used for multicast-broadcast single-frequency network (MBSFN) transmission. A network may configure and use some of 10 subframes included in a radio frame as MBSFN subframes. The $1^{st}$, $2^{nd}$, $3^{rd}$, $6^{th}$, $7^{th}$ and $8^{th}$ subframes may be used as MBSFN subframes in the case of FDD, and the $3^{rd}$, $4^{th}$, $7^{th}$, $8^{th}$ and $9^{th}$ subframes may be used as MBSFN subframes in the case of TDD. A system supporting 3GPP Release 14 may configure and use all the subframes in the case of FDD, and may configure and use all the subframes except the $2^{nd}$ subframe as MBSFN subframes in the case of TDD.

In LTE, an RB has been defined to map physical channels (e.g., a physical downlink control channel (PDCCH), a physical downlink shared channel (PDSCH), a physical uplink control channel (PUCCH) and a physical uplink shared channel (PUSCH)). This may be identically applied to the 5G system. As described above, an RB includes a plurality of OFDM subcarriers and a plurality of OFDM symbols. If a 15 kHz subcarrier interval is used, 12 subcarriers may form one RB. If a 7.5 kHz subcarrier interval is used, 24 subcarriers may form one RB.

The LTE system provides various bandwidths. The number of RBs included in a corresponding carrier may be different based on a bandwidth. For example, an LTE carrier having a 20 MHz bandwidth has 100 RBs. A 10 MHz LTE carrier has 50 RBs. Each RB within one carrier has an index, and the index may be used in various ways. For example, the index may be used for resource allocation and an enhanced physical downlink control channel (ePDCCH) resource configuration. In the case of LTE, an LTE UE may receive a physical broadcast channel (PBCH) and index an RB using bandwidth information within the PBCH because an RB having a different subcarrier interval is not subjected to FDM, but is subjected to only TDM as in the MBSFN. A frequency resource may be indicated based on RB indexing.

In the case of a 5G system according to an embodiment of the disclosure, a radio resource having a different subcarrier interval may be configured for each carrier and radio resources having various subcarrier intervals may be subjected to FDM. In the 5G system, the RB concept may be identically used and one RB may include 12 subcarriers. If the size of an RB is fixed and the number of subcarriers included in an RB is determined based on a subcarrier interval, frequency indexing is not required because a frequency location indicated by an RB index is the same. If the size of an RB is not fixed and the size of the RB varies based on a subcarrier interval, RB indexing is required because a frequency location indicated by an RB may be different based on an RB index.

Figure 2:
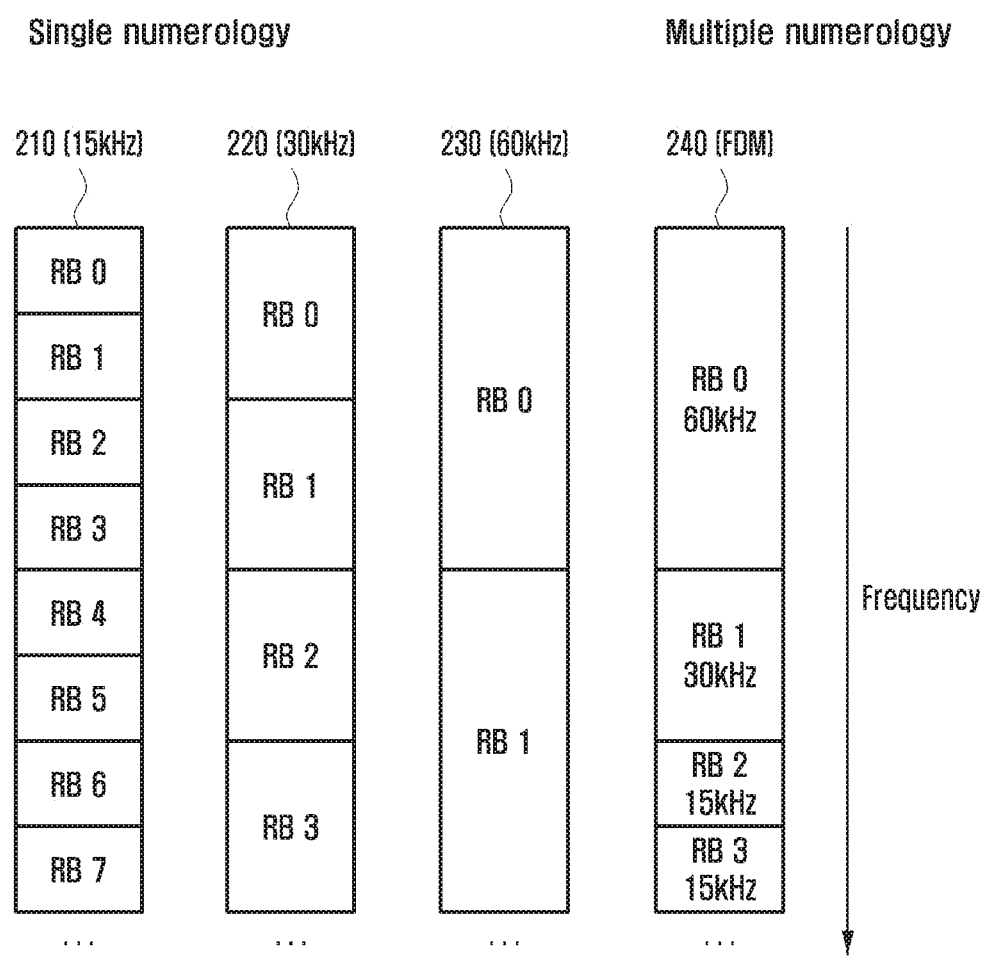
FIG. 2 is a diagram showing frequency configurations of carriers according to an embodiment of the disclosure.

FIG. 2 is a diagram showing a frequency configurations of carriers according to an embodiment of the disclosure.

Referring to FIG. 2, RB grids 210, 220 and 230 show the configurations and indexing of RBs according to subcarrier intervals if carriers have the same subcarrier interval (single numerology). An RB grid 240 shows the configuration and indexing of RBs if radio resources having various subcarrier intervals are subjected to FDM (multiple numerologies).

The RB grid 210 shows when a subcarrier interval is 15 kHz. The RB grid 220 shows an RB grid when a subcarrier interval is 30 kHz. The RB grid 230 shows an RB grid when a subcarrier interval is 60 kHz. The RB grid 240 shows an RB grid in a carrier in which a plurality of subcarrier intervals has been configured. A method of configuring an RB grid may be various because the subcarrier interval may be configured in various ways. The RB grid may be configured in various ways depending on how FDM has been configured in a carrier in which a plurality of subcarrier intervals has been configured.

An RB grid may be configured in various ways based on a subcarrier interval and FDM. The RB index may indicate the location of a frequency resource in the frequency axis. If a subcarrier interval is different, the location of a frequency resource may be different depending on how an RB has been mapped in the frequency axis although the RB index is the same. If frequency information identified by a UE and frequency information identified by a base station are different with respect to the same RB index, a problem is generated in resource allocation or scheduling. Accordingly, an embodiment of the disclosure provides a method for a UE and a network to identify the same resource location based on an RB index.

Figure 3:
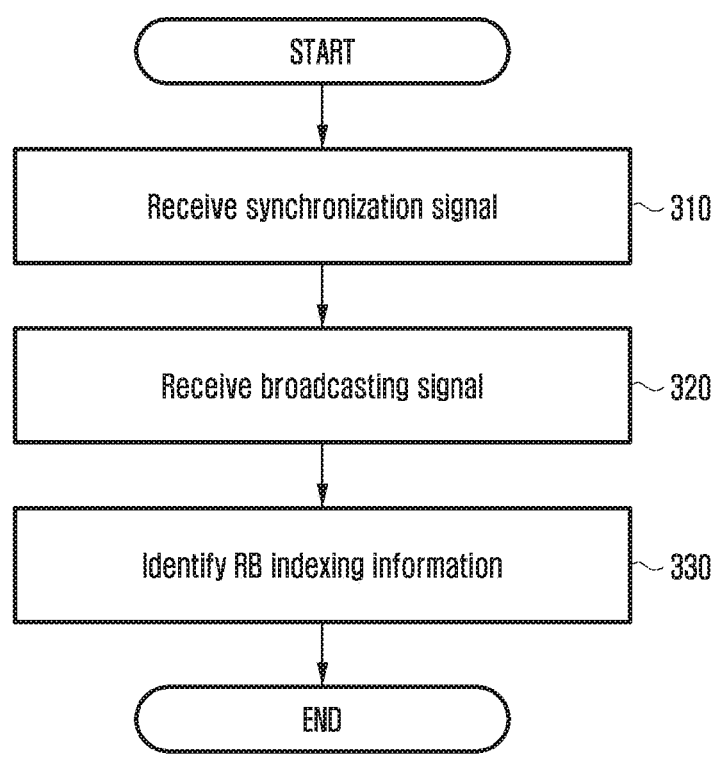
FIG. 3 is a diagram showing a procedure for a user equipment (UE) to identify frequency resource information according to an embodiment of the disclosure.

FIG. 3 is a diagram showing a procedure for a UE to identify frequency resource information according to an embodiment of the disclosure.

Referring to FIG. 3, at operation 310, the UE may receive a synchronization signal. The synchronization signal may be a synchronization signal received from a base station. The synchronization signal may include at least one of a primary synchronization signal (PSS) and a secondary synchronization signal (SSS). The UE may obtain synchronization based on the PSS and the SSS.

When the synchronization is obtained, the UE may receive a broadcasting signal at operation 320. The broadcasting signal may include at least one of a system information block (SIB) and a master information block (MIB). The MIB may include information on the bandwidth of a cell. For example, the MIB may include 3-bit information indicating a bandwidth. The bandwidth information included in the MIB may be downlink bandwidth information. The MIB may further include physical hybrid-ARQ indicator channel (PHICH) configuration information and information on a system frame number (SFN). Since the MIB includes restrictive information, the UE may additionally obtain information on a base station and a cell by receiving the SIB.

In an embodiment of the disclosure, the subcarrier interval of a PBCH may be the same as that of a synchronization signal, but the disclosure is not limited thereto. If a system or a base station does not provide separate indication for a subcarrier interval, it may be assumed that the same subcarrier interval as the subcarrier interval of a PBCH or a synchronization signal is used.

In an embodiment of the disclosure, subcarrier interval information supported by a base station or a cell may be provided through an SIB. The subcarrier interval information may be information indicating the size of the frequency band of a subcarrier that is used in a frequency band provided by the base station. For example, the subcarrier interval information may be information indicating 7.5 kHz, 15 kHz, 30 kHz, 60 kHz or 120 kHz, and may be information of 2 bits or 3 bits, for example. For example, the subcarrier interval information may be configured as in Table 1.

TABLE 1

| Subcarrier interval information | Subcarrier interval |
|---|---|
| 000 | 7.5 kHz |
| 001 | 15 kHz |
| 010 | 30 kHz |
| 011 | 60 kHz |
| 100 | 120 kHz |
| ... | ... |

The subcarrier interval information is not limited to the example of Table 1 and may be implemented in various manners. For example, the number of bits may be different from that in the information of Table 1. As in Table 2, the subcarrier interval information may be associated with information on frequency bands provided by a base station.

TABLE 2

| Subcarrier interval information | Subcarrier interval 1 (bandwidth is n GH or less) | Subcarrier interval 2 (bandwidth exceeds n GH) |
|---|---|---|
| 00 | 7.5 kHz | 60 kHz |
| 01 | 15 kHz | 120 kHz |
| 10 | 30 kHz | |
| 11 | 60 kHz | |

(e.g., n may be 6, and the size of n is not limited to 6.)

As described above, the subcarrier interval information may be provided in various manners. A base station may provide information on a candidate group of subcarrier intervals that belongs to a plurality of pieces of subcarrier interval information and that may be supported by the base station. The information on the candidate group is information on the candidate of subcarrier interval information in which the base station indicates an available subcarrier interval, and may include one or a plurality of pieces of subcarrier interval information based on the capability of a base station.

If the frequency band of a base station or cell is configured based on a plurality of subcarrier intervals, configuration information of a frequency band corresponding to each subcarrier interval may be included. The subcarrier interval information and/or the configuration information of the frequency band may include a SIB 1 or a SIB 2. At least one of the subcarrier interval information and the configuration information of the frequency band may be included in an MIB. The SIB 2 may include information on an uplink bandwidth. The configuration information of the frequency band may also be called frequency band pattern information or frequency pattern information.

As described above, the subcarrier interval information may be provided to a UE through a broadcasting signal, and the UE may identify/recognize the subcarrier interval information using a different method. For example, information on a subcarrier interval may have been previously configured. If a subcarrier interval is previously configured, information on a frequency band and information on the subcarrier interval may have been previously configured. A subcarrier interval may have been previously configured based on a frequency band of a base station or cell. For example, subcarrier interval information that may be used in the case of a first frequency band, and subcarrier interval information that may be used in the case of a second frequency band may have been previously configured. Furthermore, a subcarrier interval may have been previously configured based on a frequency band range. For example, available subcarrier interval information and available second frequency information may have been previously configured based on the size of a frequency band. For example, a UE may determine that a 5G carrier of less than 6 GHz may have a subcarrier interval of 7.5 kHz, 15 kHz, 30 kHz or 60 kHz and a 5G carrier of 6 GHz or higher may have a subcarrier interval of 60 kHz or 120 kHz. In such a case, the UE may identify at least one piece of subcarrier interval information based on the characteristics of a frequency band. Alternatively, the UE may have had information on subcarrier intervals defined in the 3GPP standard document.

A UE may identify the start and end of a corresponding carrier in the frequency axis based on a received synchronization signal and a broadcasting signal. If a synchronization signal or PBCH are located in a region other than a designated location (e.g., a center or an edge) within a 5G carrier, a broadcasting signal may include information by which the start or end of a corresponding carrier in the frequency axis can be aware.

At operation 330, the UE may identify RB indexing information. The UE may generate RB indexing information and store the generated RB indexing information. That is, the RB indexing information may be implemented in such a way as to be stored in the memory of the UE and may be implemented in such a manner that RB indexing information is calculated and checked without being stored in the memory of the UE. The UE may identify/generate an RB index based on bandwidth information. The UE may identify/generate an RB index based on bandwidth information and subcarrier interval information. If information on a frequency configuration is provided, the UE may identify/generate RB indexing information based on bandwidth information, subcarrier interval information, and the frequency configuration information.

Thereafter, the UE may perform a random access channel (RACH) procedure and perform communication with the base station. The UE may perform communication with the base station using the RB indexing information identified/generated at operation 330.

First Embodiment

The first embodiment is an embodiment in which an RB index is identified/generated using bandwidth and subcarrier interval information. A UE may receive a synchronization signal, and may receive a broadcasting signal after obtaining synchronization. The UE may identify the start and end locations of a carrier based on the received synchronization signal and broadcasting signal. If the synchronization signal or a PBCH are located in a region other than a designated location within a carrier, the broadcasting signal may include information by which the start or end of a corresponding carrier in the frequency axis can be aware.

A UE may identify/generate/manage RB index mapping information according to a first embodiment using information received through a broadcasting signal. An RB grid for each subcarrier interval has been described above with reference to FIG. 2. In accordance with an embodiment of the disclosure, an RB index may be determined based on frequency interval information, and the location of a frequency resource may be determined based on an RB index. For example, a UE may identify/generate/manage an RB index mapping table, such as that of Table 3. The RB indexing of FIG. 2 may be considered to be RB indexing based on an RB indexing method according to a first embodiment of the disclosure. As shown in FIG. 2, in the first embodiment, 0~n RB indices may be sequentially generated with respect to respective subcarrier intervals. Although RB indices are the same, the start and end locations of a corresponding RB may be different based on subcarrier interval information.

For example, an RB index mapping table may be configured as in Table 3 and is not limited to the configuration of Table 3. It is assumed that one RB includes 12 subcarriers. Table 3 shows the locations of frequencies according to subcarrier intervals and RB indices.

TABLE 3

| RB index | Subcarrier interval "a" frequency band location | Subcarrier interval "b" frequency band location | Subcarrier interval "c" frequency band location |
| --- | --- | --- | --- |
| RB0 | 0~12*a Hz | 0~12*b Hz | 0~12*c Hz |
| RB1 | 12*a~2*12a Hz | 12*b~2*12b Hz | 12*c~2*12c Hz |
| RB2 | 2*12*a~3*12a Hz | 2*12*b~3*12b Hz | 2*12*c~3*12c Hz |
| RB3 | 3*12*a~4*12a Hz | 3*12*b~4*12b Hz | 3*12*c~4*12c Hz |
| RB4 | 4*12*a~5*12a Hz | 4*12*b~5*12b Hz | 4*12*c~5*12c Hz |
| ... | | | |

In Table 3, the frequency band location is construed as being a relative location from the start location of a bandwidth. In the subcarrier interval "a", in the case of the RB0, the start frequency "x+0~x+12*a Hz" region of a bandwidth is construed as being the frequency band location of an RB indicated by the RB0 index.

Referring to Table 3, since the subcarrier interval information "a", "b" and "c" are different, the location of a frequency band indicated by a corresponding RB is different although RB indices are the same.

A UE may generate RB index mapping information for one subcarrier interval and generate RB indexing information for a plurality of subcarrier intervals. For example, if subcarrier interval information is received through broadcasting information, a UE may generate RB index mapping information on the obtained subcarrier interval information. If one piece of subcarrier interval information is received, a UE may generate RB index mapping information on a plurality of subcarrier intervals because a base station may subsequently use different subcarrier interval information. If a plurality of pieces of subcarrier interval information or information on a candidate group of subcarrier interval information is received from a base station, a UE may generate RB index mapping information corresponding to the plurality of pieces of received subcarrier interval information.

A UE may generate RB index mapping information based on an operating frequency. For example, if the operating frequency is less than 6 GHz, a UE may generate RB index mapping information in which a subcarrier interval corresponds to 7.5 kHz, 15 kHz, 30 kHz or 60 kHz. If the operating frequency is 6 GHz or higher, a UE may generate RB index mapping information in which a subcarrier interval corresponds to 60 kHz or 120 kHz. A criterion for the operating frequency is not limited to 6 GHz. The configuration of subcarrier interval information used when a UE generates RB index mapping information may be determined based on a specific frequency size.

A base station may also generate RB index mapping information using the same method. The base station may be aware of information on the bandwidth of coverage served by the base station. The base station may generate/identify/manage RB index mapping information, such as Table 3, based on bandwidth information. Furthermore, if the base station uses a given subcarrier interval, it may generate RB index mapping information using bandwidth and subcarrier interval information.

Second Embodiment

The second embodiment is an embodiment in which an RB index is generated/identified/managed using a reference subcarrier interval. In the second embodiment, a UE may identify/generate/manage RB index mapping information using a reference subcarrier interval, a bandwidth and subcarrier interval information. The UE may receive a synchronization signal and receive a broadcasting signal after obtaining synchronization. The UE may identify the start and end locations of a carrier based on the received synchronization signal and broadcasting signal. If the synchronization signal or a PBCH are located in a region other than a designated location within the carrier, the broadcasting signal may include information by which the start or end of a corresponding carrier in the frequency axis can be aware. The UE may identify/generate/manage RB index mapping information according to the second embodiment using the information received through the broadcasting signal.

In the second embodiment, the RB index of a different subcarrier interval may be determined based on a reference subcarrier interval. In the first embodiment, RB indices have been contiguously allocated with respect to each subcarrier interval. In contrast, in the second embodiment, RB indices may be contiguously allocated with respect to a reference subcarrier interval, and RB indices may not be contiguously allocated with respect to a different subcarrier interval.

Figure 4:
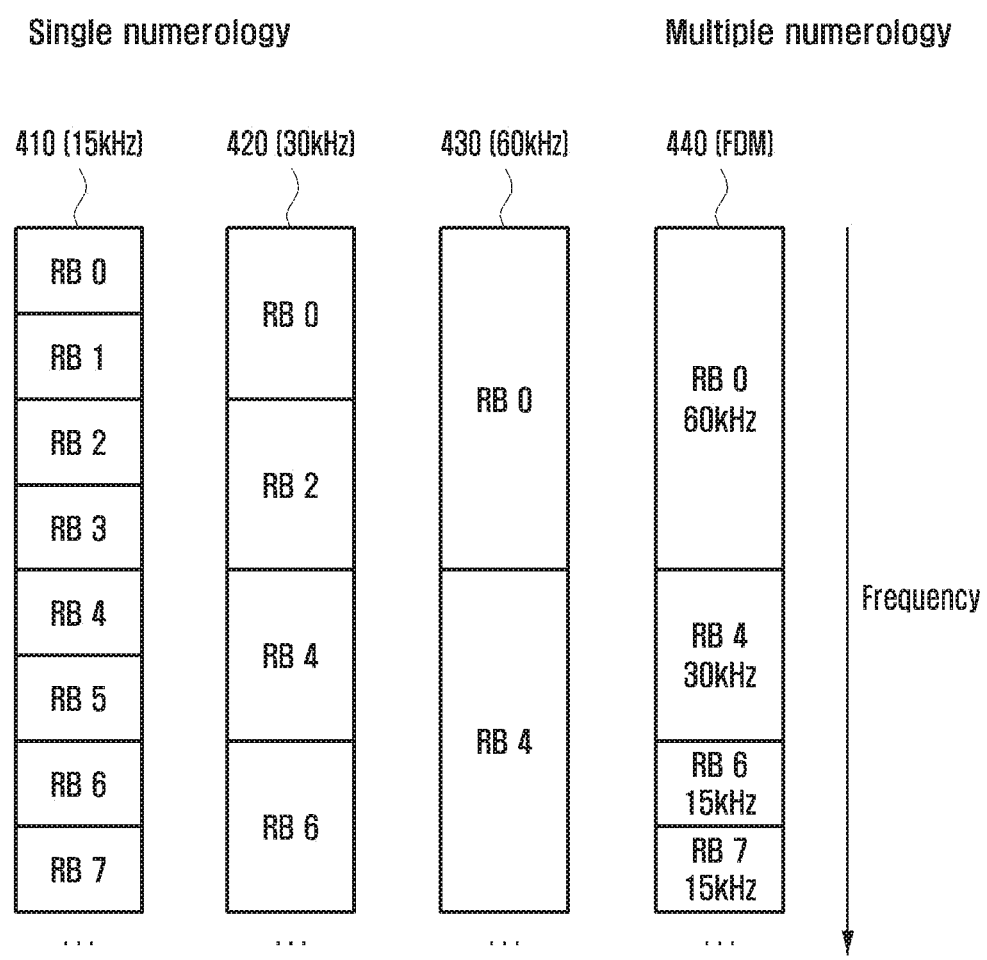
FIG. 4 is a diagram showing frequency configurations of carriers and RB grids according to a second embodiment of the disclosure.

FIG. 4 is a diagram showing frequency configurations of carriers and RB grids according to a second embodiment of the disclosure.

Referring to FIG. 4, an RB grid 410 shows an RB grid when a subcarrier interval is 15 kHz, an RB grid 420 shows an RB grid when a subcarrier interval is 30 kHz, an RB grid 430 shows an RB grid when a subcarrier interval is 60 kHz, and an RB grid 440 shows an RB grid in a carrier in which a plurality of subcarrier intervals has been configured.

In the second embodiment, a UE may generate RB index mapping information using one subcarrier interval as a reference subcarrier interval. The reference subcarrier interval may have been included in broadcasting information received by a UE from a base station and may be previously configured according to the standard or may have been previously configured and stored in a UE. A UE and a base station may use the same reference subcarrier interval as a reference based on broadcasting information or a preset method.

In FIG. 4, a reference subcarrier interval is assumed to be 15 kHz. Referring to RB indices in the RB grid 410, it may be seen that the RB indices may have been contiguously configured like an RB 0, an RB 1, an RB 2, an RB 3, ... because 15 kHz is a reference subcarrier. In the second embodiment, an RB index may be allocated/generated with respect to a different subcarrier interval based on an RB index configured based on a reference subcarrier interval.

Referring to the RB grid 420, if a subcarrier interval is 30 kHz, RB indices have been configured like an RB 0, an RB 2, an RB 4, and an RB 6. Referring to the RB grid 430, if a subcarrier interval is 60 kHz, RB indices have been configured like an RB0 and an RB4. Referring to the RB grid 440, if a plurality of subcarrier intervals has been configured in one subcarrier based on an FDM configuration, RB indices may be configured like an RB 0, an RB 4, an RB 6, and an RB 7.

In the second embodiment, RB indices for a subcarrier interval different from a reference subcarrier interval may be determined based on RB indices of the reference subcarrier interval. An RB index according to a reference subcarrier interval is called a reference RB index, and an RB index according to a target subcarrier interval that needs to be determined based on the reference subcarrier interval may be defined as a target RB index. The reference RB index may be called a first RB index, and the target RB index may be called a second RB index. For example, a target RB index may be determined based on the start location or last location of the frequency of an RB corresponding to the RB index of a reference subcarrier interval.

For example, a case where a subcarrier interval is 60 kHz is described. In the RB grid 430, the frequency start location of the RB 0 is the same as the frequency start location of the RB 0 in the RB grid 410. In the RB grid 430, the frequency start location of the RB 4 is the same as the frequency start location of the RB 4 in the RB grid 410. In the RB grid 430, a target RB index may be determined in accordance with the reference RB index of a reference subcarrier interval. In this case, the term "in accordance with" means that the frequency start locations of RBs correspond to each other. That is, in the RB grid 430, the frequency start location of the first RB is the same as the frequency start location of the first RB in the RB grid 410, and thus the first RB has the RB index of 0. However, the frequency start location of the second RB in the RB grid 430 corresponds to the frequency start location of the fifth RB in the RB grid 410, and thus the second RB may be determined to be the RB 4 based on the mapping of a reference subcarrier. Likewise, RB indexing may be performed based on the frequency last location of an RB not the frequency start location of an RB.

In the second embodiment, an expression of Equation 1 may be obtained.

$$RB\_index\_n = \left\lfloor \frac{RB\_index\_ref}{used\_SCS/ref\_SCS} \right\rfloor * used\_SCS/ref\_SCS \quad \text{Equation 1}$$

RB_index_n may mean a target RB index to be determined, and RB_index_ref may mean the reference RB index of a reference subcarrier. used_SCS means the subcarrier interval of an RB corresponding to the target RB index, and ref_SCS means a reference subcarrier interval.

In the second embodiment of the disclosure, a target RB index having a different subcarrier interval may be determined based on a reference subcarrier interval and a reference RB index using such a method.

In accordance with the second embodiment of the disclosure, an RB index mapping table may be configured like Table 4, but is not limited to the configuration of Table 4. It is assumed that one RB includes 12 subcarriers.

TABLE 4

| Frequency start location | 15 kHz (reference) | 30 kHz | 60 kHz | 120 kHz |
|---|---|---|---|---|
| 0 | 0 | 0 | 0 | 0 |
| 15 kHz * 12 | 1 | — | — | — |
| 2* 15 kHz *12 | 2 | 2 | — | — |
| 2* 15 kHz *12 | 3 | — | — | — |
| 2* 15 kHz *12 | 4 | 4 | 4 | — |
| 2* 15 kHz *12 | 5 | — | — | — |
| 2* 15 kHz *12 | 6 | 6 | — | — |

In Table 4, the frequency start location is construed as being a relative location from the start location of a bandwidth. According to Table 4, it may be seen that the same RB index as a reference RB index according to a reference subcarrier interval is determined if frequency start locations are the same although subcarrier intervals are different. Accordingly, if an RB index is allocated regardless of a subcarrier interval, a UE may identify the start location of a corresponding RB, and may identify the frequency band of an RB based on the start location and subcarrier interval of the corresponding RB.

A UE may generate RB index mapping information with respect to one target subcarrier interval based on a reference subcarrier interval, and may generate RB indexing information on a plurality of target subcarrier intervals. For example, if subcarrier interval information is received through broadcasting information, a UE may generate RB index mapping information based on obtained subcarrier interval information and reference subcarrier interval information. A UE may generate RB index mapping information on a plurality of subcarrier intervals because a base station may subsequently use different subcarrier interval information although one piece of subcarrier interval information is received. If a plurality of pieces of subcarrier interval information or information on a candidate group of subcarrier interval information is received from a base station, a UE may generate RB index mapping information corresponding to the plurality of pieces of received subcarrier interval information.

A UE may generate RB index mapping information based on an operating frequency. For example, if an operating frequency is less than 6 GHz, a UE may generate RB index mapping information in which a subcarrier interval corresponds to 7.5 kHz, 15 kHz, 30 kHz or 60 kHz. If an operating frequency is 6 GHz or higher, a UE may generate RB index mapping information in which a subcarrier interval corresponds to 60 kHz or 120 kHz. For example, referring to Table 4, if an operating frequency is less than 6 GHz, a UE may not generate index mapping information on 120 kHz. If an operating frequency is 6 GHz or higher, index mapping information on 30 kHz may not be generated. A criterion for the operating frequency is not limited to 6 GHz, and the configuration of subcarrier interval information used when a UE generates RB index mapping information may be determined based on a specific frequency size.

A base station may also generate RB index mapping information using the same method. A base station may be aware of information on the bandwidth of coverage served by the base station, and may be aware of a reference subcarrier interval. A base station may generate/identify/manage RB index mapping information, such as Table 4, based on bandwidth information and a reference subcarrier interval. Furthermore, if a base station uses a given subcarrier interval, it may generate RB index mapping information using a bandwidth, a reference subcarrier interval and the given subcarrier interval.

Third Embodiment

The third embodiment is an embodiment in which an RB index is generated/identified/managed using configuration information of a frequency band. The configuration information of a frequency band may also be called frequency band pattern information or frequency pattern information. In the third embodiment, a UE may identify/generate/manage RB index mapping information using bandwidth and subcarrier interval information and frequency pattern information. A UE may receive a synchronization signal and receive a broadcasting signal after obtaining synchronization. The UE may identify the start and end locations of a carrier based on the received synchronization signal and broadcasting signal. If the synchronization signal or a PBCH is located in a region other than a designated location within the carrier, the broadcasting signal may include information by which the start or end of the corresponding carrier in the frequency axis can be aware. A UE may identify/generate/manage RB index mapping information according to the third embodiment using the information received through the broadcasting signal. For example, a UE may identify frequency pattern information and may identify the subcarrier interval information through the broadcasting signal.

In the 5G system, radio resources having different subcarrier intervals may be subjected to FDM statically or semi-statically in one carrier. FDM-ed frequency pattern information may be included in a broadcasting signal, and may be included in an SIB, for example. Furthermore, FDM-ed frequency pattern information may have been previously configured in a UE. A UE may use basic information upon initial access, and may receive FDM-ed frequency pattern information from a base station through an RRC message after accessing a base station.

Figure 5:
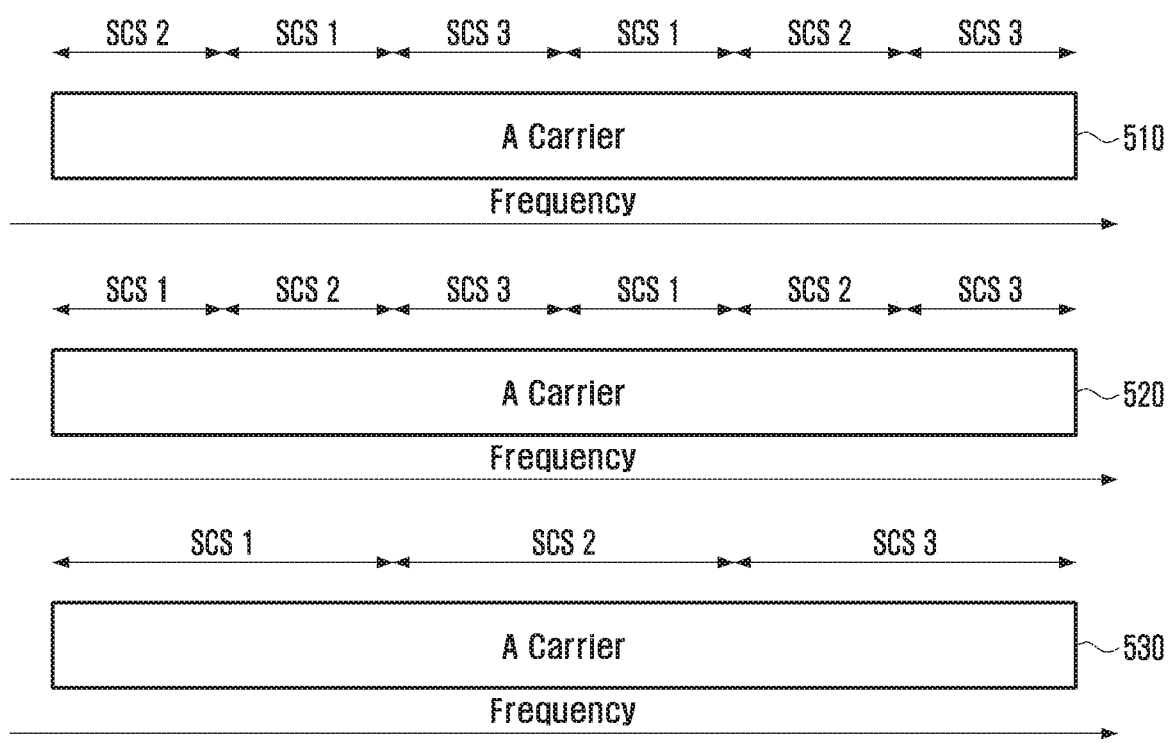
FIG. 5 is a diagram showing a frequency division multiplexing (FDM) frequency pattern configuration according to an embodiment of the disclosure.

FIG. 5 is a diagram showing an FDM frequency pattern configuration according to an embodiment of the disclosure.

Referring to FIG. 5, the FDM state means that one carrier has been classified as a set of subcarriers having a plurality of subcarrier intervals. For example, the frequency band of a carrier may include a first frequency band and a second frequency band. If the interval of subcarriers forming the first frequency band and the interval of subcarriers forming the second frequency band are different, it may be described as being FDM.

In FIG. 5, SCS indicates subcarrier spacing. The same SCS value means that subcarrier intervals are the same, and different SCS values mean that subcarrier intervals are different. SCS 1, SCS 2, and SCS 3 have different subcarrier intervals, and SCS 1 and repeated SCS 1 have the same subcarrier interval.

Referring to 510 in FIG. 5, the frequency band of an A carrier may be configured in order, such as an SCS 2 band→SCS 1 band→SCS 3 band→SCS 1 band→SCS 2 band→SCS 3 band. The configuration of the frequency band may be indicated by frequency pattern information. The frequency pattern information may include information on the location of a frequency and the subcarrier interval of each band with respect to each of the pieces of band information. A plurality of RBs may be disposed in each SCS band.

For example, the frequency pattern information may be expressed as in FIG. 5.

TABLE 5

| Frequency band location | Subcarrier interval identifier | Subcarrier interval |
|---|---|---|
| A | SCS 2 | l |
| B | SCS 1 | k |
| C | SCS 3 | m |
| D | SCS 1 | k |
| E | SCS 2 | l |
| F | SCS 3 | m |

A UE may sequentially allocate RB indices based on frequency pattern information. The UE may calculate the subcarrier interval of the SCS 2 band as l and allocate an RB index. After the SCS 2 band is terminated, the UE may allocate an RB index from an index subsequent to the RB index of the previous band in the SCS 1 band. If the RB index was ended at 15 in the SCS 2 band, the UE may allocate RB indices from 16 in the contiguous SCS 1 band. Likewise, the UE may allocate an RB index using frequency pattern information.

In the third embodiment, contiguous RB indices can be allocated and the reference RB index of a reference subcarrier interval described above in the second embodiment may also be used. A target RB index may be allocated using a reference RB index based on a frequency start location according to frequency pattern information by taking the frequency pattern information into consideration.

Referring to 520, a frequency pattern may repeatedly appear in a carrier. The frequency band of the A carrier is configured in order of an SCS 1 band→SCS 2 band→SCS 3 band, and the configuration of the SCS 1 band→SCS 2 band→SCS 3 band is repeated once more. In this case, frequency pattern information may include the same pattern information and information on the number of times that the same pattern is repeated. A procedure for a UE that has obtained a frequency pattern to generate an RB index has been described with reference to 510.

Referring to 530, one A carrier may be configured in order of an SCS 1 band→SCS 2 band→SCS 3 band. For example, assuming that the bandwidth of the A carrier is 300 MHz, the size of the SCS 1 band may be 100 MHz, the size of the SCS 2 band may be 100 MHz, and the size of the SCS 3 band may be 100 MHz. In this case, the frequency start location of each band may be signaled. If the bandwidth size and order of each band are known, a UE may estimate the start locations of each bandwidth inversely.

RB index mapping information according to the third embodiment may be shown like Table 6, but is not limited to the configuration of Table 6.

TABLE 6

| Frequency pattern 1 (510) | Frequency pattern 2 (520) | Frequency pattern 3 (530) |
|---|---|---|
| RB0, SCS 2 | RB0, SCS 1 | RB0, SCS 1 |
| ... | ... | ... |
| RB $k_1$, SCS 2 | RB $k_2$, SCS 1 | RB $k_3$, SCS 1 |
| RB $k_1$ + 1, SCS 1 | RB $k_2$ + 1, SCS 2 | RB $k_3$ + 1, SCS 2 |
| ... | ... | ... |
| RB $l_1$, SCS 1 | RB $l_2$, SCS 2 | RB $l_3$, SCS 2 |
| RB $l_1$ + 1, SCS 3 | RB $l_2$ + 1, SCS 3 | RB $l_3$ + 1, SCS 3 |
| ... | ... | ... |
| RB $m_1$, SCS 3 | RB $m_2$, SCS 3 | RB $m_3$, SCS 3 |
| RB $m_1$ + 1, SCS 1 | RB $m_2$ + 1, SCS 1 | |
| ... | ... | |
| RB $n_1$, SCS 1 | RB $n_2$, SCS 1 | |
| RB $n_1$ + 1, SCS 2 | RB $n_2$ + 1, SCS 2 | |
| ... | ... | |
| RB $o_1$, SCS 2 | RB $o_2$, SCS 2 | |
| RB $o_1$ + 1, SCS 3 | RB $o_2$ + 1, SCS 3 | |
| ... | ... | |
| RB $p_1$, SCS 3 | RB $p_2$, SCS 3 | |

In Table 6, although the mapping relation between an RB and a frequency resource has been omitted by taking complexity into consideration, a frequency location corresponding to an RB index may be added to RB index mapping information because a frequency resource needs to be identified based on the RB index. The relation between an RB index and the location of a frequency resource may be derived by applying the same method as that described in the first embodiment and the second embodiment. That is, each frequency location may be mapped to each RB index using the format in which a subcarrier interval and 12 subcarriers form one RB from the start location or last location of a frequency band.

A UE may identify/generate/manage RB index mapping information using the bandwidth of a corresponding carrier, a start/end location on a frequency axis, a frequency pattern, and subcarrier interval information using the above method.

A UE may generate RB index mapping information on one pattern based on reference frequency pattern information, and may generate a plurality of pieces of RB index mapping information based on a plurality of pieces of frequency pattern information. A UE may generate RB index mapping information on a plurality of frequency patterns because a base station may subsequently use different frequency pattern information although one piece of frequency pattern information is received. To this end, frequency pattern information may have been previously determined. For example, a frequency pattern may be predefined according to the standard. Alternatively, an available frequency pattern may have been previously configured based on a frequency bandwidth or center frequency. Furthermore, n frequency patterns that may be used by a base station may be present, and information indicating that which one of the n patterns will be used may be provided as frequency pattern information.

A base station may also generate RB index mapping information using the same method. The base station may be aware of information on the bandwidth of coverage served by the base station, and may also be aware of frequency band pattern information. The base station may generate/identify/manage RB index mapping information based on the bandwidth information and the frequency pattern information. Furthermore, the base station previously generates mapping information on a plurality of frequency patterns available for the base station. When the base station selects to use a given frequency pattern, it may use RB indexing information corresponding to the selected pattern.

In accordance with the third embodiment of the disclosure, additional frequency interval information may not need to be provided for resource allocation because information on a frequency interval is provided based on a predetermined frequency pattern.

Figure 6:
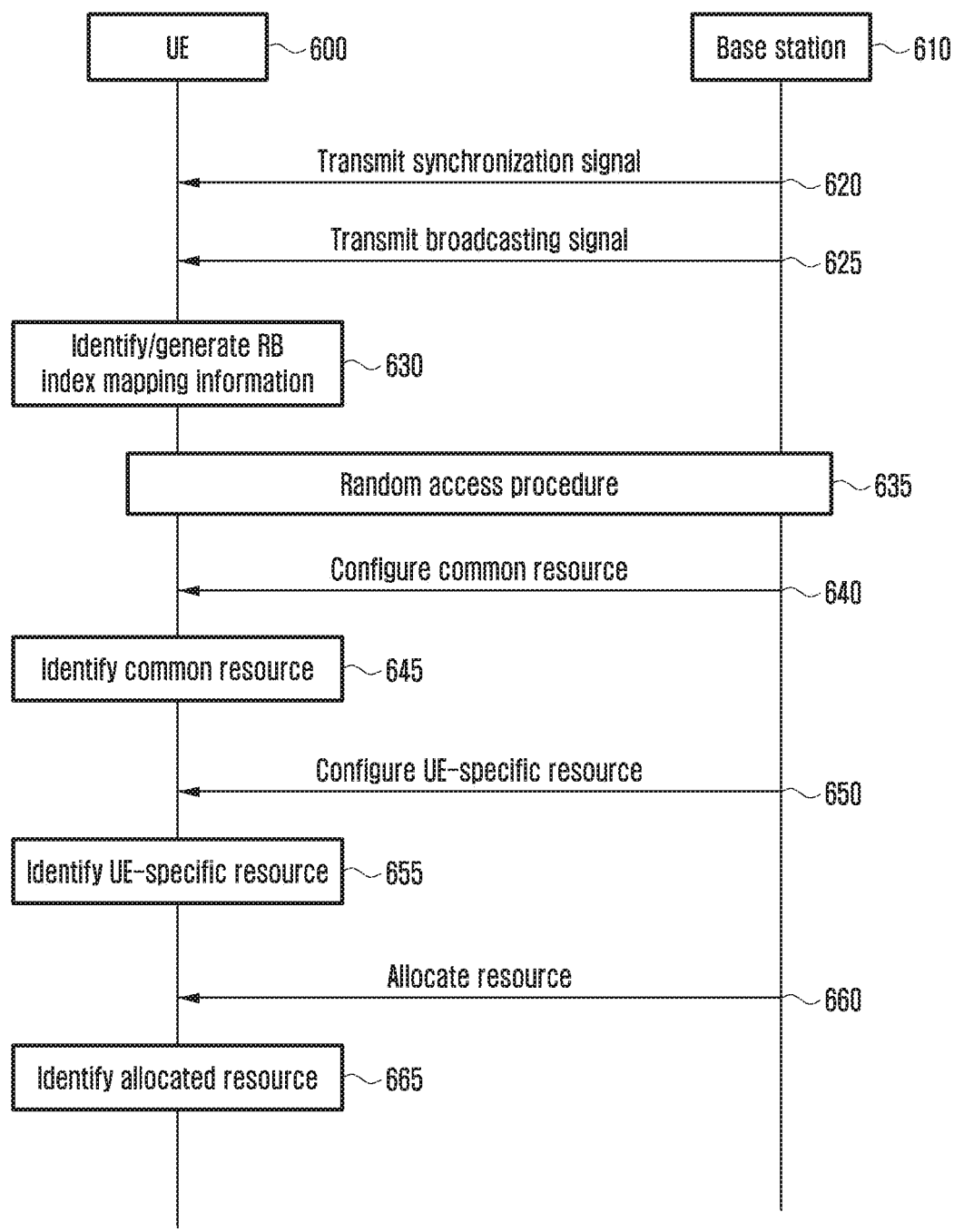
FIG. 6 is a diagram showing an operating procedure of a UE and a base station according to an embodiment of the disclosure.

FIG. 6 is a diagram showing an operating procedure of a UE and a base station according to an embodiment of the disclosure.

Referring to FIG. 6, a communication system according to the disclosure may include a UE 600 and a base station 610.

At operation 620, the UE 600 may receive a synchronization signal from the base station 610. The UE 600 may obtain synchronization with the base station 610 based on the reception of the synchronization signal. Reference is made to the configuration of FIG. 3 for the detailed contents of the synchronization signal.

At operation 625, the UE 600 may receive a broadcasting signal from the base station 610. The broadcasting signal may include an MIB and an SIB. Reference is made to the configuration of FIG. 3 for the detailed contents of the broadcasting signal.

The UE may identify information on a frequency bandwidth managed by the base station 610 or a cell of the base station 610 and information on the start and end locations of a frequency through operation 620 and operation 625. Additionally, the UE may obtain subcarrier interval information, reference subcarrier information and frequency pattern information.

At operation 630, the UE 600 may identify/generate RB index mapping information based on the information on the bandwidth received from the base station 610. The UE 600 may store the identified or generated RB index mapping information in memory. The UE 600 may generate RB index mapping information using the information on the bandwidth, the subcarrier interval information, the reference subcarrier information and the frequency pattern information. The UE 600 may generate RB index mapping information including pieces of RB indexing information corresponding to at least two subcarrier intervals, respectively. The methods described in the first embodiment, second embodiment and third embodiment of the disclosure may be applied to a detailed method of generating the RB index mapping information.

That is, the UE may generate RB index mapping information for each subcarrier interval according to the first embodiment, may generate RB index mapping information for each subcarrier interval using reference subcarrier interval information according to the second embodiment, and may generate RB index mapping information using frequency pattern information according to the third embodiment. Furthermore, the UE may generate RB index mapping information by a combination of the embodiments.

The base station 610 may identify/generate/store/manage RB index mapping information. The base station 610 may generate RB index mapping information using the same method as the method used by the UE 600. In this case, an operation of obtaining a bandwidth, subcarrier interval information, a reference subcarrier interval and frequency pattern information may be omitted because the base station 610 is previously aware of them. A method for the base station to generate RB index mapping information using already obtained information may be the same as the method described by taking the UE as an example in the first, second and third embodiments of the disclosure. If the base station 610 has received a bandwidth, subcarrier interval information, reference subcarrier interval information and frequency pattern information from a higher node or has received indication for them, the base station may generate RB index mapping information using the information received from the higher node. The time when the base station 610 generates RB index mapping information is not specifically limited, and may be prior to operation 620.

At operation 635, the UE 600 and the base station 610 may perform a random access procedure. The UE 600 may transmit a random access preamble to the base station 610 through the random access procedure, and the base station 610 may transmit a random access response to the UE 600 through the random access procedure.

After the random access procedure, the UE 600 and the base station 610 may perform a data communication operation.

The UE 600 and the base station 610 may obtain RB index mapping information through the data communication operation. When the base station 610 indicates a given RB index, the UE 600 may identify the location of a frequency resource where the RB index is positioned based on the RB index mapping information and the subcarrier interval information.

Operations subsequent to operation 640 correspond to a process for the UE 600 and the base station 610 to perform communication using the generated and/or identified RB index mapping information. Operation 640, operation 650 and operation 660 are not limited to the sequence of FIG. 6, the sequence may be changed, and the same operation may be repeatedly performed.

At operation 640, the base station 610 may configure a common resource for the UE 600. For example, the base station 610 may indicate a resource to which a common search space or a UE group search space belongs for the UE 600. The common resource configuration may include RB indexing information, and may include subcarrier interval information, if necessary. If pattern indication is necessary, frequency pattern information may be additionally included.

The resource to which the common search space/UE group search space belongs may be configured in the UE through broadcasting signal information. The corresponding resource may include at least one control resource set. The control resource set may include at least one physical resource block (PRB). PRBs belonging to one control resource set may be contiguous in the frequency axis or may not be contiguous.

The broadcasting signal and the resource to which the common search space/UE group search space belongs may use the same subcarrier interval. In this case, the base station 610 may notify the UE 600 of resource information using an RB index that belongs to generated RB index mapping information and that is related to a corresponding subcarrier interval. The base station 610 may include an RB index that belongs to generated RB index mapping information and that corresponds to a subcarrier interval that is now used in a broadcasting signal, and may transmit the broadcasting signal to the UE 600. Accordingly, the base station 610 can notify the UE 600 of the resource information to which a common search space/UE group search space belongs.

A broadcasting signal and a resource to which a common search space/UE group search space belongs may be configured to use different subcarrier intervals. In this case, the base station 610 may include an RB index that belongs to generated RB index mapping information and that corresponds to a corresponding subcarrier interval in a broadcasting signal along with subcarrier interval information that is now used, and may transmit the broadcasting signal to the UE 600. Accordingly, the base station 610 can notify the UE 600 of the resource information to which a common search space/UE group search space belongs.

Overhead may be great if all of RB indices are included in a broadcasting signal in order to indicate a resource. Accordingly, the base station 610 may include only the first index or last index of RB indices in a broadcasting signal. The size of a resource in the frequency axis is at least one control resource set, and thus the number of control resource sets may be additionally included in a broadcasting signal. Alternatively, if the number of control resource sets has been previously configured or defined, information on the number may not be signaled. If PRBs included in a control resource set are not contiguous, a pattern of a control resource set indicating the PRBs may have been previously defined. An identifier indicating the pattern of the control resource set may be included in a broadcasting signal with the first index or last index of RB indices.

At operation 645, the UE 600 may identify a common resource based on the common resource configuration information and RB index mapping information received from the base station 610. The UE 600 may identify an RB index corresponding to the RB index mapping information based on the RB index and the subcarrier interval information, and may identify the location of the common resource indicated by the identified RB index. The location of the common resource may be the location of a resource to which a common search space or a UE group search space belongs. The UE 600 may identify the location of the common resource, and may check a message, information or a packet provided from the base station 610 to the UE 600 through the common resource.

At operation 650, the base station 610 may configure UE-specific resource information in the UE 600. The base station may configure a resource to which a UE-specific search space belongs. For example, the base station 610 may configure the resource to which a UE-specific search space belongs through RRC signaling.

The corresponding resource may include at least one control resource set. The control resource set may include at least one PRB. PRBs belonging to one control resource set may be contiguous in the frequency axis or may not be contiguous.

A 5G network may determine a subcarrier interval to be used by a UE. For example, the 5G network may configure at least one subcarrier interval for a given UE and notify the UE of the location of a resource in which the corresponding subcarrier interval is used. In this case, the base station 610 may use generated RB index mapping information. That is, the index of a subcarrier interval to be configured and the RB index of a resource in which the corresponding subcarrier interval is used may be RRC signaled.

The base station 610 may receive feedback from the UE 600 and determine a subcarrier interval to be used by the UE 600. For example, a random access preamble may be divided in a random access preamble transmission process. That is, a random access preamble for each subcarrier interval may be divided or a PRACH resource for each subcarrier interval may be divided. Accordingly, the base station 610 may receive feedback for information on a subcarrier interval that may be used by the UE 600. Furthermore, when the UE 600 makes a capability report, it may report information on a subcarrier interval that may be supported by the UE 600 to the base station 610. Furthermore, a subcarrier interval that may be supported by the UE 600 may be determined based on a version or transmission mode (TM) of the UE 600. When the version or TM mode of the UE 600 is reported to the base station 610, the base station 610 may identify information on a subcarrier interval that may be used by the UE 600 based on the version or TM mode information. Furthermore, an index corresponding to a subcarrier interval may be included in an RRC signal transmitted from the UE 600 to a 5G network. The base station 610 may include a corresponding RB index in an RRC signal based on subcarrier interval information received from the UE 600 using a method, such as that described above, and may transmit the RRC signal to the UE 600. The feedback of the UE 600 and the allocation of the RB index of the base station 610 based on the feedback may be applied to all the embodiments of the disclosure. Furthermore, in each of the embodiments of the disclosure, when the UE 600 generates RB index mapping information, it may generate the RB index mapping information by taking its capability into consideration. For example, if the capability of the UE 600 does not support a 120 kHz subcarrier interval, the UE may not generate/store/manage mapping information on a subcarrier interval that is not supported by the UE when it generates RB index mapping information.

Overhead may be great if all of RB indices are included in a broadcasting signal in order to indicate resources. Accordingly, the base station 610 may include only the first index or last index of RB indices in a broadcasting signal. The size of a resource in the frequency axis is at least one control resource set, and thus the number of control resource sets may be additionally included in RRC signaling. Alternatively, if the number of control resource sets has been previously configured or defined, corresponding information may not be signaled. If PRBs included in a control resource set are not contiguous, a pattern of the control resource set for indicating the PRBs may have been previously defined. An identifier indicating a pattern of a control resource set may be included in RRC signaling with the first index or last index of RB indices.

At operation 655, the UE 600 may identify a UE-specific resource based on the UE-specific resource configuration information received from the base station 610 and the RB index mapping information. The UE 600 may identify a corresponding RB index of the RB index mapping information based on the RB index and the subcarrier interval information, and may identify the location of a common resource indicated by the identified RB index. The location of the UE-specific resource may be the location of a resource to which a UE-specific search space belongs. The UE 600 may identify the location of the UE-specific resource, and may check a message, information or a packet provided from the base station 610 to the UE 600 through the UE-specific resource.

At operation 660, the base station 610 may transmit resource allocation information to the UE 600. In order for the base station 610 to transmit downlink data to the UE 600 or so that the UE 600 may transmit uplink data to the base station, the base station 610 may configure a downlink resource or uplink resource for the UE 600. The resource allocation information may also be called scheduling information. The resource allocation information may be transmitted to the UE 600 through a PDCCH. The PDCCH may include information on the location of a radio resource to be used for the downlink or uplink. The corresponding radio resource location information may be based on RB index mapping information. The base station 610 may notify the UE 600 of radio resource information using an RB index corresponding to a subcarrier interval configured in the UE 600 or a subcarrier interval to be configured in the UE 600.

A scheduling unit may be a resource block group (RBG) unit including at least one RB. RBs belonging to one RBG may be contiguous in the frequency axis or may not be contiguous. The number of RBs belonging to an RBG may have been defined in the standard. If RBs included in an RBG are not contiguous, a corresponding pattern may be indicated. The pattern may have been previously defined in the standard. The index of an RBG corresponding to a subcarrier interval may be included in a PDCCH as scheduling information.

If a PDSCH/PUSCH in which the subcarrier interval of a PDCCH and data are transmitted have the same subcarrier interval or if the relation between the subcarrier intervals of a PDSCH/PUSCH in which the subcarrier interval of a PDCCH and data are transmitted is semi-statically fixed (e.g., when the PDCCH uses subcarrier spacing of 60 kHz and the PDSCH/PUSCH uses subcarrier spacing of 30 kHz), an index corresponding to the subcarrier interval of the PDSCH or PUSCH may not be included in the PDCCH.

If the relation between the subcarrier intervals of a PDSCH/PUSCH in which the subcarrier interval of a PDCCH and data are transmitted is dynamically changed, an index corresponding to the subcarrier interval of the PDSCH or PUSCH may be included in the PDCCH along with the RB index or the RBG index.

Likewise, RB index mapping information may be used to determine the location of the resource of a PUCCH (e.g., if the location is signaled through a PDCCH or a UE implicitly derives the location). The RB index mapping information used to determine the location of the resource of the PUCCH may correspond to RB index mapping information used for a PDCCH or data (e.g., the subcarrier spacing of the same PUCCH and the subcarrier spacing of a PDCCH or data may be the same or may have a determined relation.)

At operation 665, the UE 600 may identify the UE-specific resource based on the resource allocation information received from the base station 610 and the RB index mapping information. The UE 600 may identify a corresponding RB index of the RB index mapping information based on the RB index and the subcarrier interval information, and may identify the location of the resource indicated by the identified RB index. The UE 600 may receive downlink data or transmit uplink data at the identified resource location.

The UE 600 and the base station 610 may identify the location of a resource indicated by an RB index using the above method in a mobile communication system using various subcarrier intervals.

Figure 7:
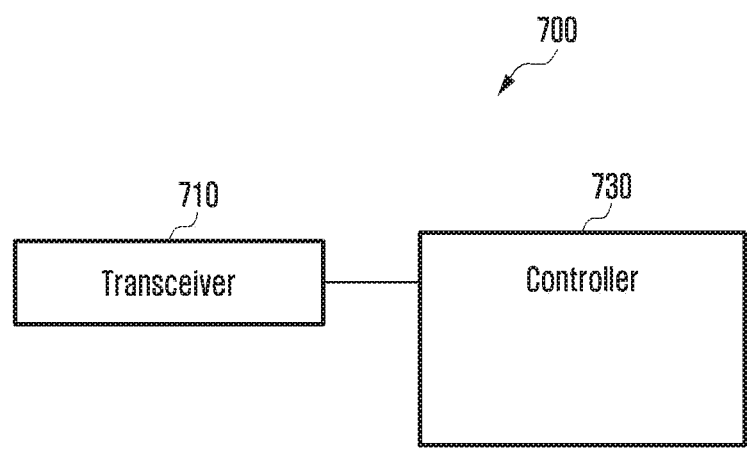
FIG. 7 is a diagram showing a configuration of a UE according to an embodiment of the disclosure.

FIG. 7 is a diagram showing a configuration of a UE according to an embodiment of the disclosure.

Referring to FIG. 7, the UE 700 may include a transceiver 710 and a controller 730. The transceiver 710 may transmit/receive a signal, information, data or a packet. The transceiver 710 may transmit/receive a signal, information, data or a packet under the control of the controller 730. The controller 730 may include at least one processor. The controller 730 may control an overall operation of the UE 700. The transceiver 710 may control the transmission/reception of a signal, information, data or a packet.

In accordance with an embodiment of the disclosure, the controller 730 may control to receive bandwidth information from a base station, to generate RB index mapping information based on the bandwidth information and subcarrier interval information, to receive RB indexing information indicating resource information from the base station, and to identify the location of the resource information based on the RB indexing information, the subcarrier interval of the resource information, and the RB index mapping information.

Furthermore, the controller 730 may configure the RB index mapping information so that it includes first RB indexing information corresponding to first subcarrier interval information and second RB indexing information corresponding to second subcarrier interval information. Furthermore, the controller 730 may determine at least one of the first RB indexing information and the second RB indexing information based on reference RB indexing information corresponding to reference subcarrier interval information.

Furthermore, the controller 730 may control to receive frequency pattern information including information on a first frequency band and a second frequency band. The controller 730 may control to generate the RB indexing information based on the first frequency band, first subcarrier interval information of the first frequency band, the second frequency band, and second subcarrier interval information of the second frequency band.

Furthermore, the controller 730 may determine the type of subcarrier interval, included in the RB index mapping information, based on at least one piece of information of the capability of the UE and the bandwidth information.

The UE 700 has been described with reference to FIG. 7, but an embodiment of the disclosure is not limited to the configuration of the UE 700. The UE 700 may perform the operations of the UE described with reference to FIGS. 1 to 6. The controller 730 may control the UE 700 to perform the operations of the UE described with reference to FIGS. 1 to 6.

Figure 8:
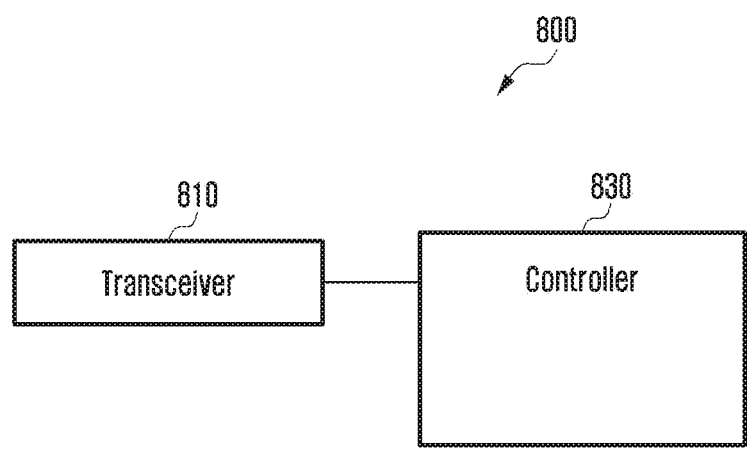
FIG. 8 is a diagram showing a configuration of a base station according to an embodiment of the disclosure.

FIG. 8 is a diagram showing a configuration of a base station according to an embodiment of the disclosure.

Referring to FIG. 8, the base station 800 may include a transceiver 810 and a controller 830. The transceiver 810 may transmit/receive a signal, information, data or a packet. The transceiver 810 may transmit/receive a signal, information, data or a packet under the control of the controller 830. The controller 830 may include at least one processor. The controller 830 may control an overall operation of the base station 800. The transceiver 810 may control the transmission/reception of a signal, information, data or a packet.

In accordance with an embodiment of the disclosure, the controller 830 may control to generate RB index mapping information based on bandwidth information and subcarrier interval information, to transmit the bandwidth information to a UE, and to transmit an RB index indicating a part of resource information of the bandwidth to the UE based on the RB index mapping information. The controller 830 may control to determine the RB index based on the subcarrier interval of the resource information and the RB index mapping information.

Furthermore, the controller 830 may configure the RB index mapping information so that it includes first RB indexing information corresponding to first subcarrier interval information and second RB indexing information corresponding to second subcarrier interval information. The controller 830 may determine at least one of the first RB indexing information and the second RB indexing information based on reference RB indexing information corresponding to reference subcarrier interval information.

Furthermore, the controller 830 may control to transmit frequency pattern information, including information on a first frequency band and a second frequency band, to a UE. The controller 830 may generate the RB indexing information based on the first frequency band, first subcarrier interval information of the first frequency band, the second frequency band, and second subcarrier interval information of the second frequency band.

Furthermore, the controller 830 may determine the type of subcarrier interval, included in the RB index mapping information, based on at least one piece of information of the capability of the UE and the bandwidth information.

The base station 800 has been described with reference to FIG. 8, but an embodiment of the disclosure is not limited to the configuration of the base station 800. The base station 800 may perform the operations of the base station described with reference to FIGS. 1 to 6. The controller 830 may control the base station 800 to perform the operations of the base station described with reference to FIGS. 1 to 6.

In accordance with an embodiment of the disclosure, the method and apparatus for using resource information in a wireless communication system can be provided.

Furthermore, in accordance with an embodiment of the disclosure, the method and apparatus for indexing an RB can be provided, and the communication method and apparatus based on RB indexing can be provided.

Furthermore, various embodiments of the disclosure disclosed in the specification and drawings propose only specific examples in order to easily describe the contents of the disclosure and help understanding of the disclosure, and are not intended to restrict the scope of the disclosure. Accordingly, all of modifications or variations derived based on the technical spirit of the disclosure should be construed as being included in the scope of the disclosure in addition to the disclosed embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for a terminal, the method comprising:
    receiving a master information block (MIB) including information on a subcarrier spacing from a base station;
    receiving resource information related to a control resource set from the base station;
    identifying a frequency domain of the control resource set based on the information on the subcarrier spacing and the resource information; and
    receiving resource allocation information on a physical downlink control channel (PDCCH) based on the identified frequency domain.

2. The method of claim 1, wherein the MIB further includes information on frequency bandwidth configuration.

3. The method of claim 1, wherein the information on the subcarrier spacing is determined based on a specific carrier frequency.

4. A terminal comprising:
    a transceiver configured to transmit and receive signals; and
    a controller configured to:
        receive a master information block (MIB) including information on a subcarrier spacing from a base station,
        receive resource information related to a control resource set from the base station,
        identify a frequency domain of the control resource set based on the information on the subcarrier spacing and the resource information, and
        receive resource allocation information on a physical downlink control channel (PDCCH) based on the identified frequency domain.

5. The terminal of claim 4, wherein the MIB further includes information on frequency bandwidth configuration.

6. The terminal of claim 4, wherein the information on the subcarrier spacing is determined based on a specific carrier frequency.

7. A method for a base station, the method comprising:
    transmitting a master information block (MIB) including information on a subcarrier spacing to a terminal;
    transmitting resource information related to a control resource set to the terminal; and
    transmitting resource allocation information on a physical downlink control channel (PDCCH) based on a frequency domain,
    wherein the frequency domain of the control resource set is identified based on the information on the subcarrier spacing and the resource information by the terminal.

8. The method of claim 7, wherein the MIB further includes information on frequency bandwidth configuration.

9. The method of claim 7, wherein the information on the subcarrier spacing is determined based on a specific carrier frequency.

10. A base station comprising:
    a transceiver configured to transmit and receive signals; and
    a controller configured to:
        transmit a master information block (MIB) including information on a subcarrier spacing to a terminal,
        transmit resource information related to a control resource set to the terminal, and
        transmit resource allocation information on a physical downlink control channel (PDCCH) based on a frequency domain,
    wherein the frequency domain of the control resource set is identified based on the information on the subcarrier spacing and the resource information by the terminal.

11. The base station of claim 10, wherein the MIB further includes information on frequency bandwidth configuration.

12. The base station of claim 10,
    wherein the information on the subcarrier spacing is determined based on a specific carrier frequency.

* * * * *